(12) United States Patent
Huddle

(10) Patent No.: US 7,142,983 B2
(45) Date of Patent: Nov. 28, 2006

(54) METHOD FOR THE PROCESSING OF NON-CONTINUOUS ATOM INTERFEROMETER INTERTIAL INSTRUMENT MEASUREMENTS AND CONTINUOUS WIDE BANDWIDTH INSTRUMENT MEASUREMENTS WITH A GRAVITY DATABASE

(75) Inventor: James R. Huddle, Chatsworth, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 229 days.

(21) Appl. No.: 10/884,048

(22) Filed: Jul. 2, 2004

(65) Prior Publication Data
US 2005/0004750 A1   Jan. 6, 2005

Related U.S. Application Data

(60) Provisional application No. 60/485,050, filed on Jul. 3, 2003.

(51) Int. Cl.
*G01C 21/16* (2006.01)
(52) U.S. Cl. ...................... 701/220; 701/200
(58) Field of Classification Search ............... 701/200, 701/220; 250/251, 252.1; 342/357.14
See application file for complete search history.

(56) References Cited
U.S. PATENT DOCUMENTS
4,874,942 A * 10/1989 Clauser ................ 250/251

| 5,339,684 A | 8/1994 | Jircitano |
| 6,014,103 A | 1/2000 | Sumner |
| 6,185,502 B1 | 2/2001 | Sumner |
| 6,493,631 B1 | 12/2002 | Burns |

* cited by examiner

Primary Examiner—Y. Beaulieu
(74) Attorney, Agent, or Firm—Carmen B. Patti & Associates

(57) ABSTRACT

Embodiments of the system provide for processing non-continuous atom interferometer inertial instrument measurements and continuous wide bandwidth instrument measurements with a gravity database. An embodiment may have: a gravity disturbance vector database having gradients; a comparator that compares real-time gravity gradiometer gradient measurements with gradients from the database to provide an observation; and a Kalman filter that receives the observation on an input thereof, the Kalman filter outputting a modeled error state vector; wherein the gravity disturbance vector from the gravity database is used to remove a known portion of an actual gravity disturbance vector from specific force measurements of high bandwidth conventional inertial accelerometers to thereby form navigation data. An embodiment of the method that may have the steps of: providing a gravity disturbance vector database having stored gradients; providing real-time measurements of gravity gradients; and processing the stored gradients and the gravity gradients to form navigational data.

24 Claims, 4 Drawing Sheets

METHOD FOR THE PROCESSING OF NON-CONTINUOUS ATOM INTERFEROMETER INERTIAL INSTRUMENT MEASUREMENTS AND CONTINUOUS WIDE BANDWIDTH INSTRUMENT MEASUREMENTS WITH A GRAVITY DATABASE

CROSS-REFERENCE TO RELATED APPLICATION

This application claims the priority of U.S. provisional Patent Application Ser. No. 60/485,050 (by James R. Huddle, filed Jul. 3, 2003, and entitled "A METHOD FOR THE PROCESSING OF NON-CONTINUOUS ATOM INTERFEROMETER INERTIAL INSTRUMENT MEASUREMENTS AND CONTINUOUS WIDE BANDWIDTH INSTRUMENT MEASUREMENTS WITH A GRAVITY DATABASE").

TECHNICAL FIELD

The present invention relates generally to navigation, and in particular to processing of non-continuous atom interferometer inertial instrument measurements and continuous wide bandwidth instrument measurements with a gravity database.

BACKGROUND

Prior art passive navigation systems utilizing only gyroscopes and accelerometers do not provide the continuous velocity, position, and attitude accuracy generally required for the long-term operation of such systems. Position, velocity, and attitude errors caused by drift and gravitational effects on these inertial sensors, rendered them unacceptable as a sole sensor in a navigation system for operation over the long term. Operation over the long term of these prior art inertial navigation systems required periodic updates of position. These updates were generally provided by fixes from the Global Positioning System (GPS), a radar navigation system, or a sonar system.

Significant improvements have been made in inertial instruments such as gyroscopes and accelerometers. Drift has been reduced to insignificant levels leaving only the gravitational effects as the major source of error. Though gravimetric maps are available for the correction of inertial sensor performance, highly accurate corrections can be made with the use of these maps only if the position of the vehicle is precisely known and the maps are error free. Additionally, the vertical gravitational field which is deflected by the coriolis effect is further deflected by the motion of the vehicle. Vertical deflection, create horizontal components, which are known as horizontal gravity anomalies. These anomalies impact on inertial navigation systems very much like accelerometer errors. As the vehicle traverses through the anomalous gravity field, the Schuler loop is excited and velocity and position errors are generated which increase with time. Consequently, if a completely inertial navigation system is to provide sufficient accuracy over the long term, inertial sensor errors, caused by anomalous gravitational fields, must be corrected in real time.

Known passive navigation systems provide continuous updating of position, velocity, and attitude information of a vehicle without recourse to radiating or external navigation aids. Such a prior art system computes navigation information with the utilization of gravity sensors, gravimetric maps, vertical position, and velocity measurements. Sensor and map data are processed by real time filtering to compute the best position, velocity, and attitude of the vehicle. The products of measured gravity gradients and the velocity of the vehicle are integrated over time to obtain a north, east, down gravity vector components which are combined with corresponding components obtained from a vertical deflection map in a complementary filter. North and east components of the combination are compared with the corresponding components from the vertical deflection map, while the down component of the gravity is compared to the down value obtained from a gravimeter. Residuals from these comparisons are utilized in a Kalman filter to provide corrections that render inertial measuring units in the system independent of the vertical deflections and gravity anomalies. Measured gravity gradients are compared to reference map gradients, the residuals being utilized in the kalman filter to estimate long-term position errors and to provide correction for gradiometer bias and drift. A vertical position loop mixes gravity down data obtained from a gravimeter and gravity down data obtained from the integrator to provide vertical position which is compared to a reference derived from the difference between a measured vehicle height and terrain height obtained from a geoidal map. The residual of this comparison is utilized in the Kalman filter to improve estimates of east velocity.

However, there is still a need in the prior art for improved navigation systems. For example, use of a gravity database that provides information corresponding to the earth's normal ellipsoidal gravitational model my not be sufficient for accurate navigation. Prior art devices also have a practical problem of unbounded error in the computed gravity disturbance vector due to integrated gradiometer white noise that occurs in the standard method.

SUMMARY

The invention in one implementation encompasses a system for processing non-continuous atom interferometer inertial instrument measurements and continuous wide bandwidth instrument measurements with a gravity database. One embodiment of the system may have: a gravity disturbance vector database having gradients; a comparator that compares real-time gravity gradiometer gradient measurements with gradients from the database to provide an observation; and a Kalman filter that receives the observation on an input thereof, the Kalman filter outputting a modeled error state vector; wherein the gravity disturbance vector from the gravity database is used to remove a known portion of an actual gravity disturbance vector from specific force measurements of high bandwidth conventional inertial accelerometers to thereby form navigation data.

Another implementation of the present invention encompasses a method that may have the steps of: providing a gravity disturbance vector database having stored gradients; providing real-time measurements of gravity gradients; and processing the stored gradients and the gravity gradients to form navigational data.

BRIEF DESCRIPTION OF THE DRAWINGS

Features of exemplary implementations of the invention will become apparent from the description, the claims, and the accompanying drawings in which:

DETAILED DESCRIPTION

The particular values and configurations discussed in these non-limiting examples can be varied and are cited merely to illustrate an embodiment of the present invention and are not intended to limit the scope of the invention.

Atom interferometer inertial force sensors offer the prospect of unprecedented performance for rotation, acceleration and gravity gradient measurements. Atom interferometers have already demonstrated considerable sensitivity to gravitational acceleration, and their projected sensitivity to rotational motion exceeds that of the best laboratory ring laser gyroscopes. This is because their Sagnac phase shifts, proportional to the total mass energy of the interfering particle, are 1010 times larger for atoms than for photons traversing the same geometry.

Figure 1:
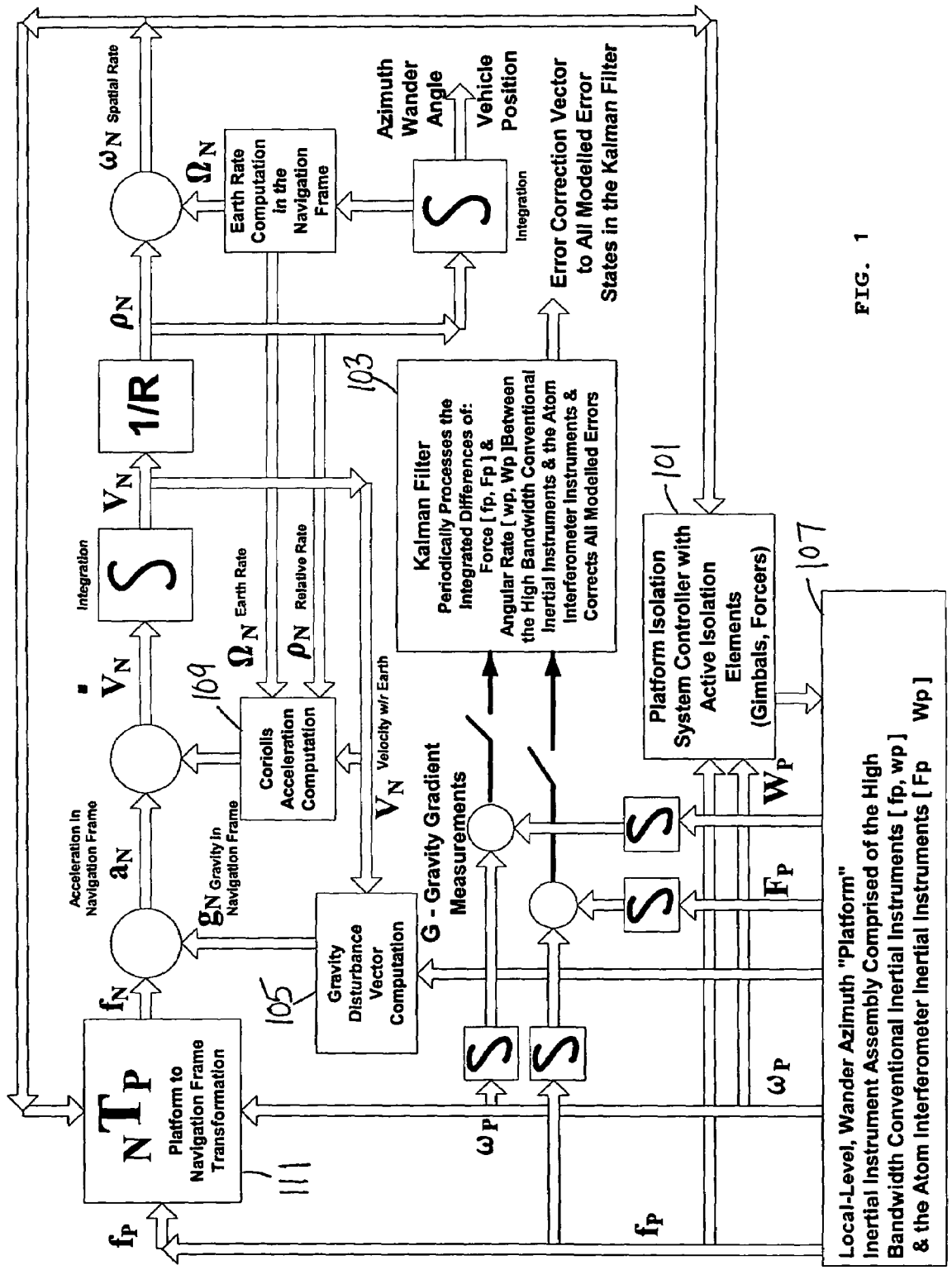
FIG. 1 depicts a block diagram that illustrates elements of a prior art navigation system.

The signal flow for a standard integration of the Atom Interferometer (AI) inertial sensors with the higher bandwidth conventional gyro and accelerometer inertial sensors is depicted in FIG. 1. The conventional inertial (CI) sensors are used to provide a continuous strapdown navigation solution at a sampling rate of several hundred hertz and are collocated on a common element with the AI inertial sensors. The high bandwidth CI sensors provide force $[f_P]$ and angular rate $[\omega_P]$ measurements to the Platform Isolation System Controller 101 that provides the dynamic environment required by the AI sensors to maximize the continuity and accuracy of their force $[F_P]$ and angular rate $[W_P]$ measurements. As depicted in FIG. 1, the CI sensors and the AI sensors are part of subsystem 107. The common element for the inertial instruments is nominally "local-level" at a "wander azimuth" angle with respect to North that avoids a singularity in the navigation system solution at the poles of the earth. However, since a "strapdown" navigation system is mechanized with the continuous measurements of the CI sensors, small deviations of the inertial instrument coordinates with respect to the local-level, wander azimuth coordinate frame are known with extremely high accuracy.

Comparison of the integrated angular rate and the integrated force measurements provided by the AI sensors over an identical time interval with the similar integrated measurements from the CI sensors provides observations of errors in the CI sensor measurements. Through correlation of the observed CI sensor errors with the errors generated in the navigation solution using the continuous CI measurements, the errors in the navigation solution due to the CI measurements can be removed via the indicated Kalman filter mechanization 103. Note that the observations of the measurement differences between the CI and AI inertial sensors need not be continuous. These observations are monitored for integrity before being processed by the Kalman filter 103.

In general the Kalman filter 103 estimates a process by using a form of feedback control: the filter estimates the process state at some time and then obtains feedback in the form of (noisy) measurements. As such, the equations for the Kalman filter fall into two groups: time update equations and measurement update equations. The time update equations are responsible for projecting forward (in time) the current state and error covariance estimates to obtain the a priori estimates for the next time step. The measurement update equations are responsible for the feedback—i.e. for incorporating a new measurement into the a priori estimate to obtain an improved a posteriori estimate. The time update equations can also be thought of as predictor equations, while the measurement update equations can be thought of as corrector equations.

In addition to the force and rate measurements of the AI sensors, measurements of the gravity gradients [G] are provided to compensate for the gravity disturbance vector that otherwise would contaminate the navigation solution provided by the CI sensors. The measured gradients minus the gradients of the gravity vector associated with the normal potential field of the earth [U], are multiplied by the system computed vehicle velocity in the local level navigation frame $[V_N]$ and integrated in the "Gravity Disturbance Vector Computation" module 105 to obtain the change in the gravity disturbance vector in the navigation frame $[g_N]$. The gravity disturbance vector is then removed from the transformed force measurements of the CI accelerometers to obtain vehicle acceleration with respect to inertial space in the local-level navigation coordinate frame $[a_N]$. Computed Coriolis acceleration (Coriolis Acceleration Computation Module 109) is removed to provide the derivative of vehicle velocity with respect to the earth which is then integrated to obtain vehicle velocity with respect to the earth in the navigation frame $[V_N]$. Subsequent integration of the system computed vehicle velocity yields change in vehicle position with respect to the earth and the change in the wander azimuth angle of the navigation frame.

The transformation (Platform to Navigation Frame Transformation module 111) between the inertial instrument/Platform coordinate frame [P] and the Navigation coordinate frame [N] is obtained using the continuous CI gyro measurements of angular rate with respect to inertial space $[\omega_P]$ minus the system computed spatial angular rate of the navigation frame with respect to inertial space $[\omega_N]$ that is derived from system computed velocity with respect to the earth and system computed latitude that is required to compute the north and vertical components of the earth rate vector.

Figure 2:
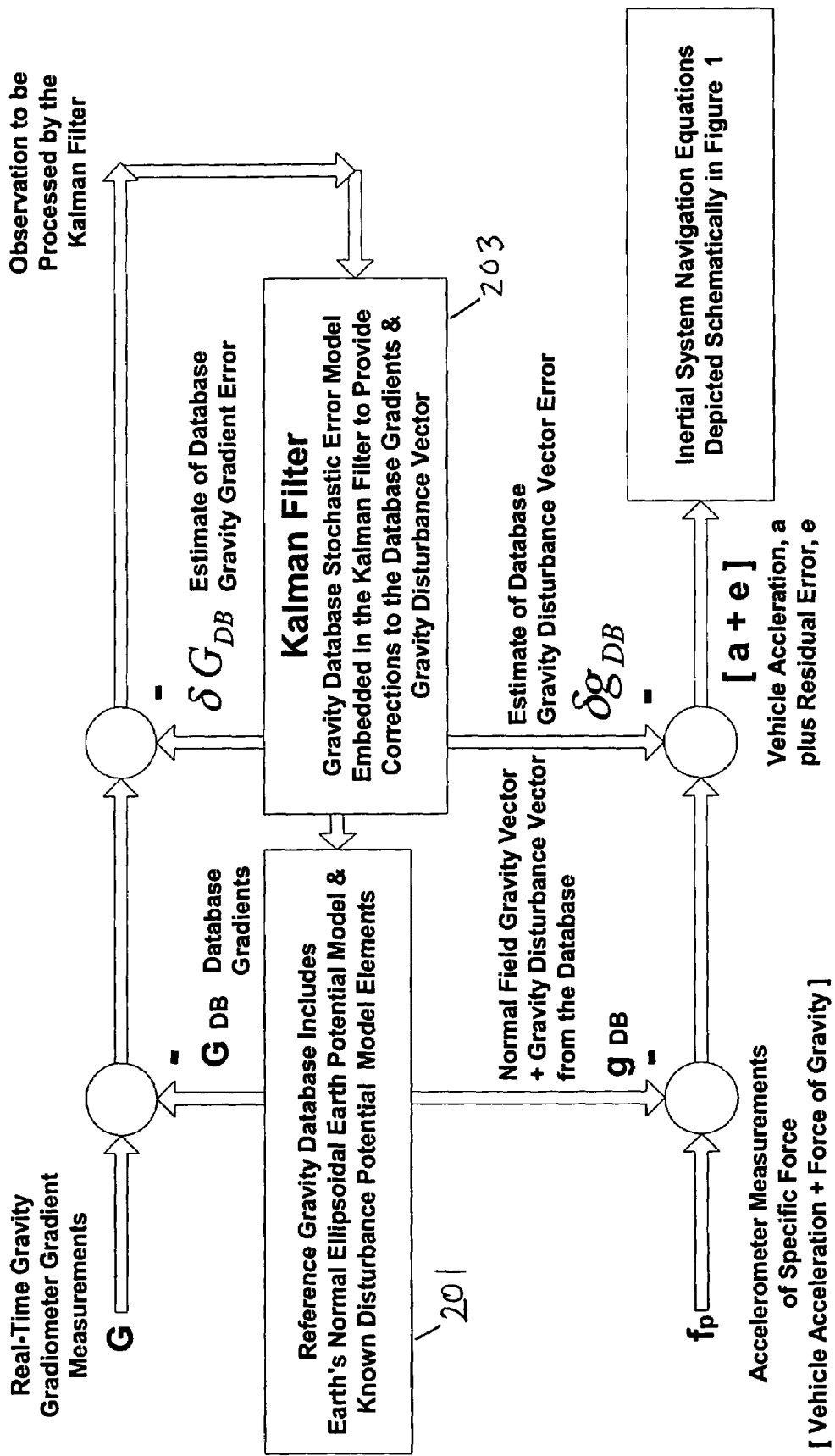
FIG. 2 depicts a block diagram that illustrates elements of a navigation system in accordance with one embodiment of the present method and system.

One embodiment of the present method and system provides a more optimal navigation system architecture than that described above. This embodiment processes all a' priori available data about the gravity field of the earth as well as the real-time measurements of the gravity gradients provided from the gradiometer. This system employs the worldwide, gravity disturbance vector database by NIMA and is shown in FIG. 2. This database 201 incorporates the long wavelengths of the anomalous gravity field that are the principal sources of error in the bandwidth of the inertial navigation system Schuler loops. The unclassified database is therefore very effective in reducing error due to the gravity disturbance vector.

The concept for the processing described below still pertains to the processing of the real-time gradiometer measurements if the NIMA gravity database is not used. Navigation performance is however improved with the use of a gravity database that provides more information beyond that corresponding to the earth's normal ellipsoidal gravitational model. This processing also avoids the practical problem of unbounded error in the computed gravity disturbance vector due to integrated gradiometer white noise that occurs in the standard method.

As shown in FIG. 2, the real-time gravity gradiometer gradient measurements (G) are compared with gradients $(G_{DB})$ available from the gravity database 201 to provide an observation to the Kalman filter 203 for correction of the modeled error state vector. Note that the Kalman filter 203 includes a stochastic model for the errors in the Gravity Database that incorporates the errors in the anomalous gravity gradients as well as the gravity disturbance vector. The principal terms in the Kalman filter 203 observation of the gradient information include random errors and bias in the real-time gradiometer measurements as well as the gradient error in the database.

The gravity disturbance vector available from the gravity database 201 is employed to remove the known portion of the actual gravity disturbance vector from the specific force measurements of the high bandwidth conventional inertial (CI) accelerometers. The gravity vector corresponding to the earth's normal gravitational model is also of course removed. Note that due to the modeling of the error in the gravity database by the Kalman filter 203, corrections to the gravity database disturbance vector are also available to reduce the error in the vehicle acceleration derived from the CI accelerometer force measurements used in the inertial navigation system equations. This latter gravity disturbance vector correction is derived primarily from the real-time observations of the difference between the measured and estimated gradients processed by the Kalman filter 203.

Figure 3:
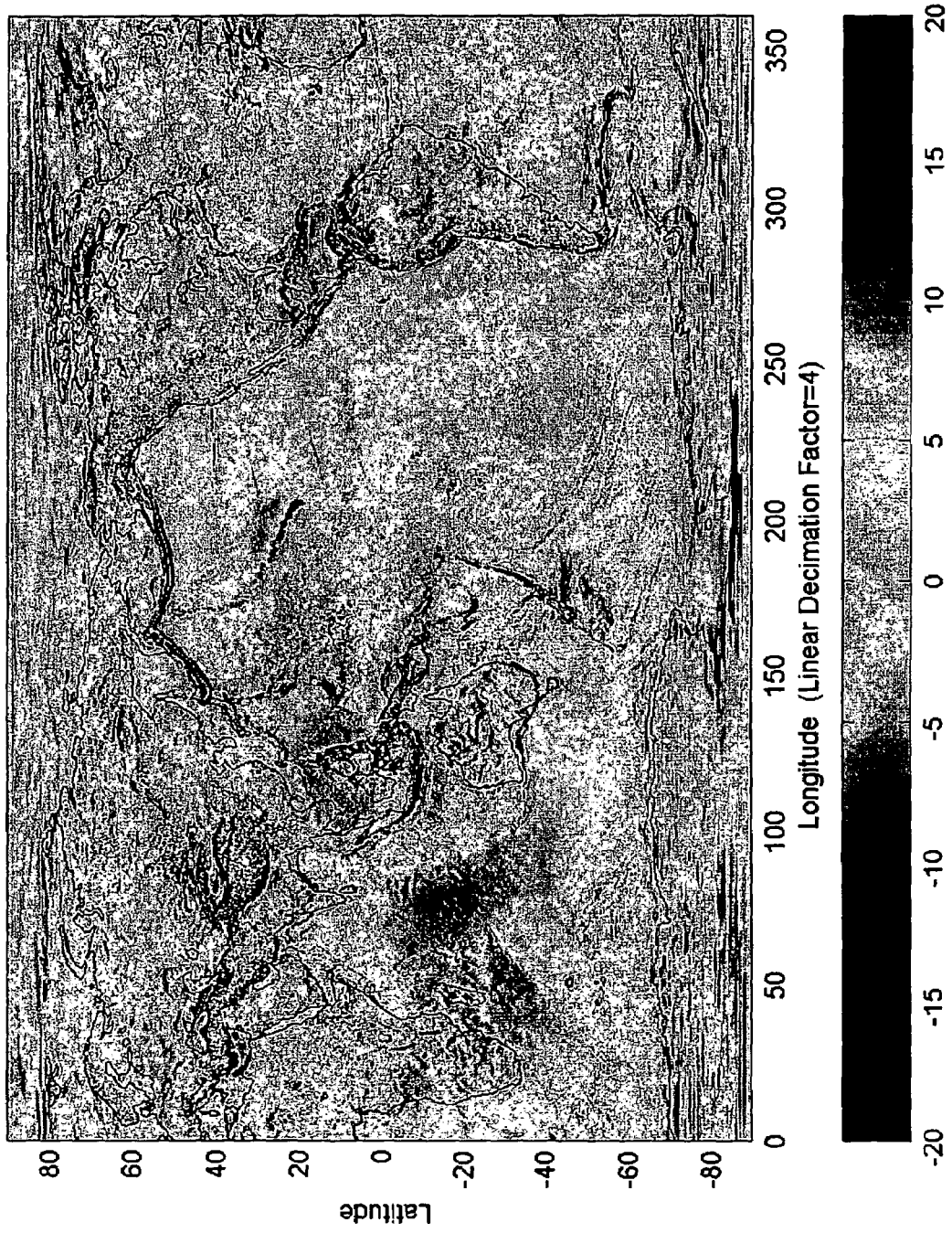
FIGS. 3 and 4 illustrate a portion of a gravity database for use with an embodiment of the present method and system.
Figure 4:
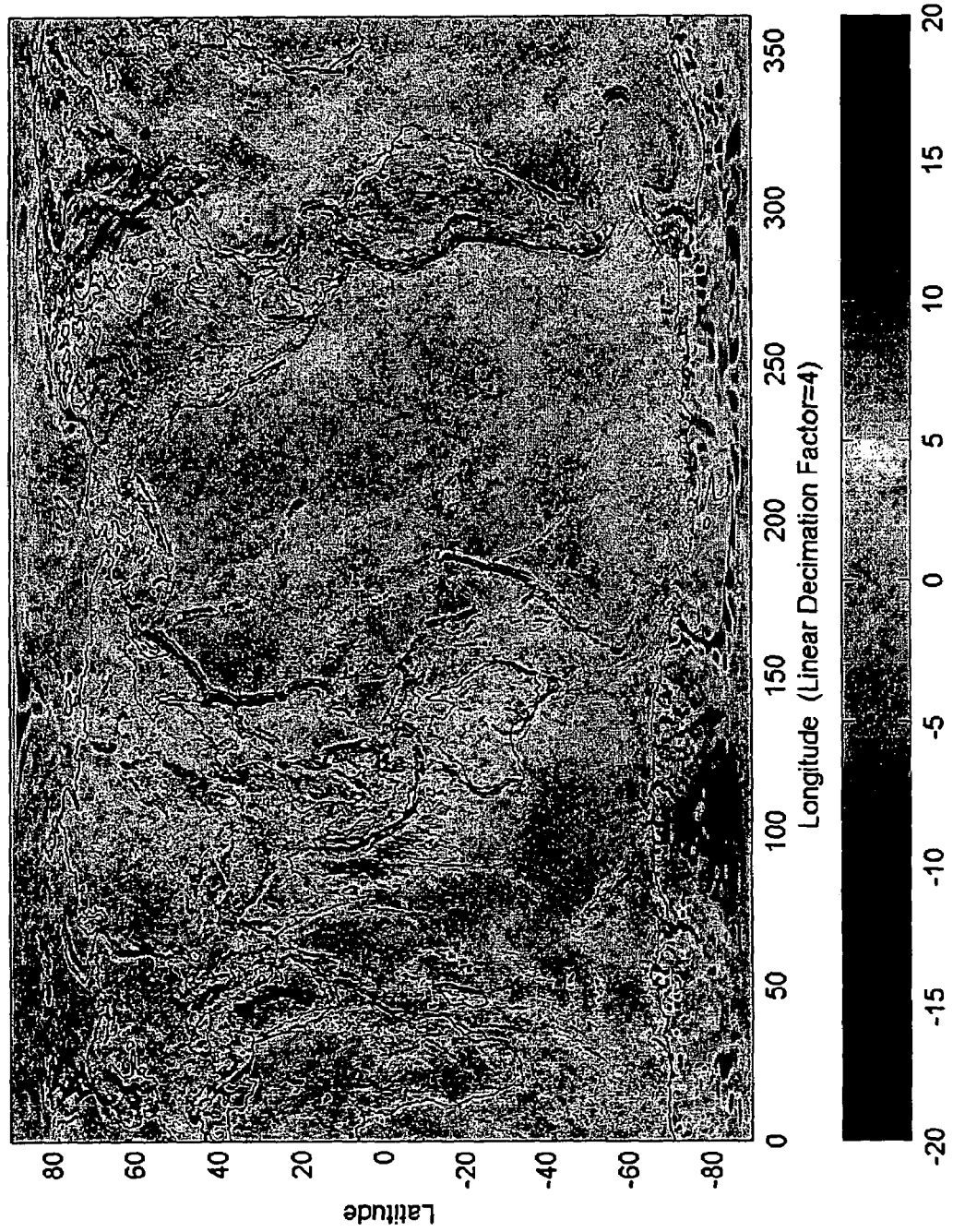

An illustration of a portion of a gravity database provided by NIMA is depicted in FIGS. 3 and 4, which show respectively the worldwide East-West and North-South deflections of the vertical at the surface of the earth.

The embodiments of the present method and system provide an improvement over the prior art navigation systems. Navigation performance is improved with the use of a gravity database that provides more information beyond that corresponding to the earth's normal ellipsoidal gravitational model. This processing also avoids the practical problem of unbounded error in the computed gravity disturbance vector due to integrated gradiometer white noise that occurs in the standard method.

The present system and method may be used with various types of navigational components other than the components described in the specific examples set forth above.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for processing of inertial instrument measurements and continuous wide bandwidth instrument measurements with a gravity database, comprising the steps of:
   comparing real-time gravity gradiometer gradient measurements to provide an error observation of an error;
   using a disturbance vector to remove the error of an actual gravity disturbance vector from measurements of high bandwidth in order to form navigational data.

2. The method according to claim 1, wherein the method further comprises:
   comparing real-time gravity gradiometer gradient measurements with gradients from the database to provide an observation;
   supplying the observation to a Kalman filter for correction of a modeled error state vector; and
   using the gravity disturbance vector from the gravity database to remove a known portion of an actual gravity disturbance vector from a specific force measurements of high bandwidth conventional inertial accelerometers.

3. The method according to claim 2, wherein the Kalman filter has a stochastic model for errors in the database that incorporates the errors in anomalous gravity gradients as well as the gravity disturbance vector.

4. The method according to claim 2, wherein Kalman filter observation of gradient information has at least random errors and bias in the real-time gravity gradiometer gradient measurements as well as the gradient error in the database.

5. The method according to claim 2, wherein the method further comprises: removing a gravity vector corresponding to earth's normal gravitational model.

6. The method according to claim 2, wherein, due to modeling of error in the gravity database by the Kalman filter, corrections to the gravity database disturbance vector are used to reduce error in the acceleration derived from conventional inertial accelerometer force measurements used in inertial navigation system equations.

7. The method according to claim 6, wherein correction to the gravity disturbance vector is derived primarily from real-time observations of a difference between measured and estimated gradients processed by the Kalman filter.

8. A system that processes non-continuous atom interferometer inertial instrument measurements and continuous wide bandwidth instrument measurements with a gravity database, comprising:
   a gravity disturbance vector database having gradients;
   a comparator that compares real-time gravity gradiometer gradient measurements with gradients from the database to provide an observation; and
   a Kalman filter that receives the observation on an input thereof, the Kalman filter outputting a modeled error state vector;
   wherein the gravity disturbance vector from the gravity database is used to remove a known portion of an actual gravity disturbance vector from specific force measurements of high bandwidth conventional inertial accelerometers to thereby form navigation data.

9. The system according to claim 8 wherein the Kalman filter has a stochastic model for errors in the database that incorporates the errors in anomalous gravity gradients as well as the gravity disturbance vector.

10. The system according to claim 8, wherein Kalman filter observation of gradient information has at least random errors and bias in the real-time gravity gradiometer gradient measurements as well as gradient error in the database.

11. The system according to claim 8, wherein a gravity vector corresponding to earth's normal gravitational model is removed.

12. The system according to claim 8, wherein, due to modeling of error in the gravity database by the Kalman filter, corrections to the gravity database disturbance vector are used to reduce error in the acceleration derived from conventional inertial accelerometer force measurements used in inertial navigation system equations.

13. The system according to claim 12, wherein correction to the gravity disturbance vector is derived primarily from real-time observations of a difference between measured and estimated gradients processed by the Kalman filter.

14. The system according to claim 12, wherein the gravity disturbance vector database is representative of at least a portion of a surface of the earth.

15. A method, comprising the steps of:
- comparing integrated angular rate and integrated force measurements provided by AI (Atom Interferometric) inertial sensors over a substantially identical time interval with integrated measurements from CI (Conventional Inertial) inertial sensors;
- observing errors in the CI sensor measurements using the comparisons;
- correlating the observed CI sensor errors with errors generated in a navigation solution obtained using the CI sensor measurements; and
- removing errors in the navigation solution due to the CI sensor measurements and removing the errors observed in the CI sensor measurements with a Kalman filter.

16. The method according to claim 15, wherein the observations of measurement differences between the CI and AI inertial sensors are not continuous.

17. The method according to claim 15, wherein the observations of measurement differences between the CI and AI inertial sensors are continuous.

18. The method according to claim 15, wherein the Kalman filter comprises time update equations and measurement update equations, wherein the time update equations projecting forward in time a current state and error covariance estimates to obtain a priori estimates for a next time step, and wherein the measurement update equations incorporate a new measurement into estimate to obtain an improved a posteriori estimate.

19. The method according to claim 18, wherein the time update equations are predictor equations, and wherein the measurement update equations are corrector equations.

20. An apparatus, comprising:
- comparator having inputs that receive integrated angular rate and integrated force measurements provided by AI (Atom Interferometric) inertial sensors over a substantially identical time interval with integrated measurements from CI (Conventional Inertial) inertial sensors, the comparator having an output that provides a result of the comparison of the received integrated angular rate and integrated force measurements;
- an observation of the errors in the CI sensor measurements using the comparisons from the comparator;
- a computer that provides a navigation solution by processing the observed CI measurements in which the navigation solution has errors due to errors in the CI sensor measurements; and
- a Kalman filter that removes the errors in the navigation solution due to the CI sensor measurement errors and removes the errors in the CI sensor measurements.

21. The apparatus according to claim 20, wherein the observations of measurement differences between the CI and AI inertial sensors are not continuous.

22. The apparatus according to claim 20, wherein the observations of measurement differences between the CI and AI inertial sensors are continuous.

23. The apparatus according to claim 20, wherein the Kalman filter comprises time update equations and measurement update equations, wherein the time update equations projecting forward in time a current state and error covariance estimates to obtain a priori estimates for a next time step, and wherein the measurement update equations incorporate a new measurement into estimate to obtain an improved a posteriori estimate.

24. The apparatus according to claim 23, wherein the time update equations are predictor equations, and wherein the measurement update equations are corrector equations.

* * * * *

UNITED STATES PATENT AND TRADEMARK OFFICE
CERTIFICATE OF CORRECTION

| | | |
|---|---|---|
| PATENT NO. | : 7,142,983 B2 | Page 1 of 1 |
| APPLICATION NO. | : 10/884048 | |
| DATED | : November 28, 2006 | |
| INVENTOR(S) | : James R. Huddle | |

It is certified that error appears in the above-identified patent and that said Letters Patent is hereby corrected as shown below:

On the Title page, Item -54- in the Title:

The word "INTERTIAL" is spelled in correctly.

Please delete "INTERTIAL" and insert -- INERTIAL --.

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,142,983 B2 | Page 1 of 1 |
| APPLICATION NO. | : 10/884048 | |
| DATED | : November 28, 2006 | |
| INVENTOR(S) | : James R. Huddle | |

It is certified that error appears in the above-identified patent and that said Letters Patent is hereby corrected as shown below:

On the Title page, Item -54- and Column 1, line 3, in the Title:

The word "INTERTIAL" is spelled in correctly.

Please delete "INTERTIAL" and insert -- INERTIAL --.

This certificate supersedes the Certificate of Correction issued February 17, 2009.

Signed and Sealed this

Seventeenth Day of March, 2009

JOHN DOLL
*Acting Director of the United States Patent and Trademark Office*